US011761888B2

(12) United States Patent
Forbes et al.

(10) Patent No.: US 11,761,888 B2
(45) Date of Patent: Sep. 19, 2023

(54) INFRARED THERMAL DESORBER AND PERFORMING INFRARED THERMAL DESORPTION

(71) Applicant: Government of the United States of America, as represented by the Secretary of Commerce, Gaithersburg, MD (US)

(72) Inventors: Thomas Patrick Forbes, Elkridge, MD (US); Matthew Edward Staymates, Damascus, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 180 days.

(21) Appl. No.: 17/144,232

(22) Filed: Jan. 8, 2021

(65) Prior Publication Data
US 2021/0215599 A1 Jul. 15, 2021

Related U.S. Application Data

(60) Provisional application No. 62/958,873, filed on Jan. 9, 2020.

(51) Int. Cl.
*G01N 21/35* (2014.01)
*G01N 1/40* (2006.01)
*G01N 21/71* (2006.01)

(52) U.S. Cl.
CPC ............. *G01N 21/35* (2013.01); *G01N 1/405* (2013.01); *G01N 21/71* (2013.01)

(58) Field of Classification Search
CPC ........ G01N 21/35; G01N 1/405; G01N 21/71; G01N 1/44; G01N 1/4022; G01N 2030/062; H01J 49/049; B01D 53/02; B01D 15/08
See application file for complete search history.

(56) References Cited

U.S. PATENT DOCUMENTS 5,741,984 A * 4/1998 Danylewych-May ...................... A61B 10/0096 73/864.71
7,244,288 B2 7/2007 Belyakov et al.
(Continued)

FOREIGN PATENT DOCUMENTS

CA 2673056 A1 * 7/2008 .......... B01F 11/0074
CN 100380034 C * 4/2008 .......... B01F 11/0002
(Continued)

OTHER PUBLICATIONS

Madarshahian, S., et al., "Infrared atmospheric solids analysis probe (IRASAP) mass spectrometry for ambient analysis of volatile compounds without heated gas", Analytical Methods, 2017, p. 5009-5014, vol. 9.
(Continued)

*Primary Examiner* — Mohamed K Amara
(74) *Attorney, Agent, or Firm* — Office of Chief Counsel for National Institute of Standards and Technology

(57) ABSTRACT

An infrared thermal desorber includes a desorption housing; an infrared source receiver that receives an infrared emission source; an infrared absorber receiver that receives an infrared absorber, such that the infrared absorber receiver produces thermal energy emission; an analyte target receiver that receives an analyte target, such that the analyte target receiver is in infrared communication with the infrared absorber disposed in the infrared source receiver so that the analyte target receives the thermal energy emission from the (Continued)

infrared absorber, desorbs the adsorbed analyte as volatilized analyte from the analyte target in response to receipt of the thermal energy emission from the infrared absorber, and communicates the volatilized analyte from the analyte target; and an effluent communicator that receives the volatized analyte.

21 Claims, 17 Drawing Sheets

(56) References Cited

U.S. PATENT DOCUMENTS

| | | | |
|---|---|---|---|
| 7,299,710 B2 | 11/2007 | Syage | |
| 7,800,056 B2 | 9/2010 | Mawer et al. | |
| 8,161,830 B2* | 4/2012 | Boudries | G01N 1/405 73/863.12 |
| 8,183,053 B1 | 5/2012 | Knobbe et al. | |
| 8,363,215 B2* | 1/2013 | Henry | G01N 1/02 356/326 |
| 8,421,018 B2 | 4/2013 | McGill et al. | |
| 8,561,486 B2* | 10/2013 | Novosselov | H01J 27/00 73/864.32 |
| 9,312,112 B2* | 4/2016 | Rafferty | H01J 49/049 |
| 10,458,885 B2* | 10/2019 | Shaw | G01N 1/02 |
| 2002/0148974 A1 | 10/2002 | Hung et al. | |
| 2006/0286606 A1* | 12/2006 | Oliver | G01N 1/2214 435/7.1 |
| 2007/0034024 A1* | 2/2007 | Syage | G01N 1/4005 73/864.34 |
| 2009/0018668 A1* | 1/2009 | Galbraith | B01D 53/02 210/175 |
| 2014/0190247 A1* | 7/2014 | Beer | G01N 19/04 250/341.1 |

FOREIGN PATENT DOCUMENTS

| | | | | |
|---|---|---|---|---|
| EP | 3093643 A1 | * | 11/2016 | ......... G01N 33/0036 |
| KR | 20110048092 A | * | 5/2011 | |

OTHER PUBLICATIONS

Forbes, T., et al., "Broad spectrum infrared thermal desorption of wipe-based explosive and narcotic samples for trace mass spectrometric detection", Analyst, 2017, p. 3002-3010, vol. 142.

Chen, W., et al., "Non-contact halogen lamp heating assisted LTP ionization miniature rectilinear ion trap: a platform for rapid, on-site explosives analysis", Analyst, 2013, p. 5068-5073, vol. 138.

Forbes, T., et al., "Detection of Nonvolatile Inorganic Oxidizer-Based Explosives from Wipe Collections by Infrared Thermal Desorption—Direct Analysis in Real Time Mass Spectrometry", Analytical Chemistry, 2018, p. 6419-6425, vol. 90.

Forbes, T., et al., "Recent advances in ambient mass spectrometry of trace explosives", Analyst, 2018, p. 1948-1969, vol. 143.

Forbes, T., et al., "Forensic Analysis and Differentiation of Black Powder and Black Powder Substitute Chemical Signatures by Infrared Thermal Desorption-DART-MS", Analytical Chemistry, 2019, p. 1089-1097, vol. 91.

Forbes, T., et al., "The Detection and Forensic Analysis of Trace Fuel Oxidizer Mixture Evidence by Infrared Thermal Desorption (IRTD) with Direct Analysis in Real Time Mass Spectrometry (DART MS): Black Powders and Black Powder Substitutes", AAFS 71 st Annual Scientific Meeting: Firearm Markings, Explosive Devices, and Components, 2019, p. 1-22.

Forbes, T., et al., "Infrared Thermal Desorption DART MS of Trace Explosive Fuel Oxidizer Mixtures: Powders, Propellants, and Pyrotechnics", 67th ASMS Conference on Mass Spectrometry and Allied Topics, 2019, p. 1-25.

Forbes, T., et al., "Infrared and Resistive Thermal Desorption Developments Coupled to DART MS for the Trace Detection of Inorganic and Organic Explosives", PITTCON 2018: Homeland Security/Forensics Technological Advances, 2018, p. 1-31.

Forbes, T., et al., "Thermal Desorption Ambient Mass Spectrometry", NIST Publication, 2017.

* cited by examiner (A)
200

(B)
200

(a) 202

(b) 202

(c) 218

INFRARED THERMAL DESORBER AND PERFORMING INFRARED THERMAL DESORPTION

CROSS REFERENCE TO RELATED APPLICATIONS

The application claims priority to U.S. Provisional Patent Application Ser. No. 62/958,873, filed Jan. 9, 2020, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce and under Agreement No. HSHQPM-15-T-00050 and FTEN-18-00014 awarded by the United States Department of Homeland Security. The Government has certain rights in the invention. Licensing inquiries may be directed to the Technology Partnerships Office, NIST, Gaithersburg, Md., 20899; voice (301)975-2573; email tpo@nist.gov; reference NIST 19-054US1.

BRIEF DESCRIPTION

Disclosed is an infrared thermal desorber comprising: a desorption housing; an infrared source receiver disposed on the desorption housing and that receives an infrared emission source such that the infrared emission source produces primary infrared emission; an infrared absorber receiver disposed on the desorption housing and that receives an infrared absorber, such that the infrared absorber receiver is in infrared communication with the infrared emission source so that the infrared absorber receives the primary infrared emission from the infrared emission source, produces thermal energy emission from the primary infrared emission in response to receipt of the primary infrared emission, and communicates the thermal energy emission from the infrared absorber; an analyte target receiver disposed on the desorption housing and that receives an analyte target, such that the analyte target receiver is in infrared communication with the infrared absorber disposed in the infrared source receiver so that the analyte target receives the thermal energy emission from the infrared absorber, desorbs adsorbed analyte as volatilized analyte from the analyte target in response to receipt of the thermal energy emission from the infrared absorber, and communicates the volatilized analyte from the analyte target; an effluent communicator disposed on the desorption housing in gas communication with the analyte target and comprising a flow outlet in gas communication with the analyte target, such that the effluent communicator receives the volatilized analyte desorbed from the analyte target in response to analyte target being subjected to the thermal energy emission from the infrared absorber; and communicates the volatilized analyte through the flow outlet from the desorption housing.

Disclosed is a process for performing infrared thermal desorption with an infrared thermal desorber, the process comprising: producing, by the infrared emission source, the primary infrared emission; receiving, by the infrared absorber, the primary infrared emission from the infrared emission source; producing, by the infrared absorber, the thermal energy emission from the primary infrared emission in response to receipt of the primary infrared emission; communicating the thermal energy emission from the infrared absorber; receiving, by the analyte target, the thermal energy emission from the infrared absorber; desorbing the adsorbed analyte as the volatilized analyte from the analyte target in response to receipt of the thermal energy emission by the analyte target from the infrared absorber; communicating the volatilized analyte from the analyte target; receiving, by the effluent communicator, the volatilized analyte desorbed from the analyte target in response to analyte target being subjected to the thermal energy emission from the infrared absorber; and communicating the volatilized analyte through the flow outlet from the desorption housing to perform infrared thermal desorption.

BRIEF DESCRIPTION OF THE DRAWINGS

The following description should not be considered limiting in any way. With reference to the accompanying drawings, like elements are numbered alike.

DETAILED DESCRIPTION

Figure 1:
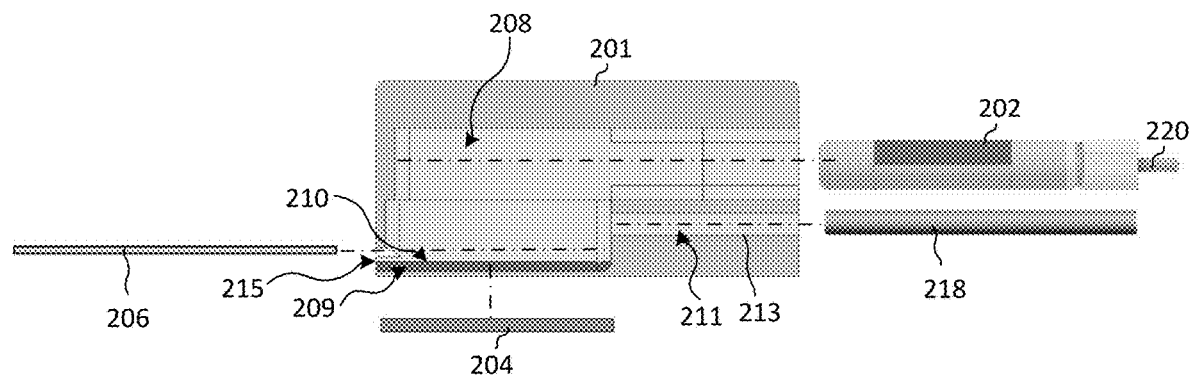
FIG. 1 shows an infrared thermal desorber in panels A and B.
Figure 1:
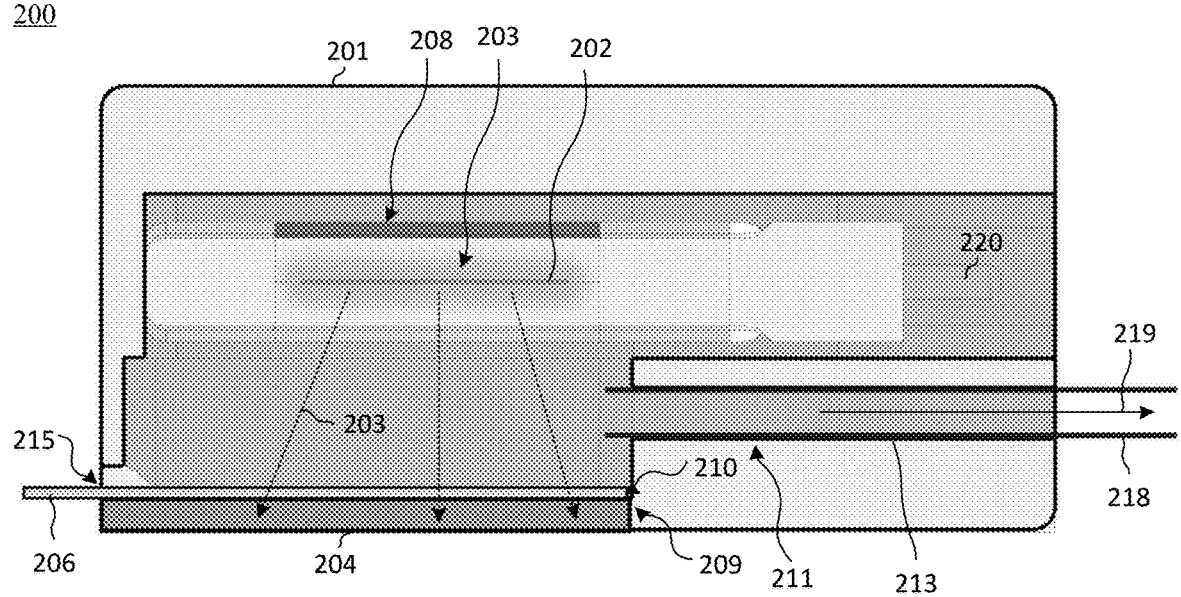
Figure 2:
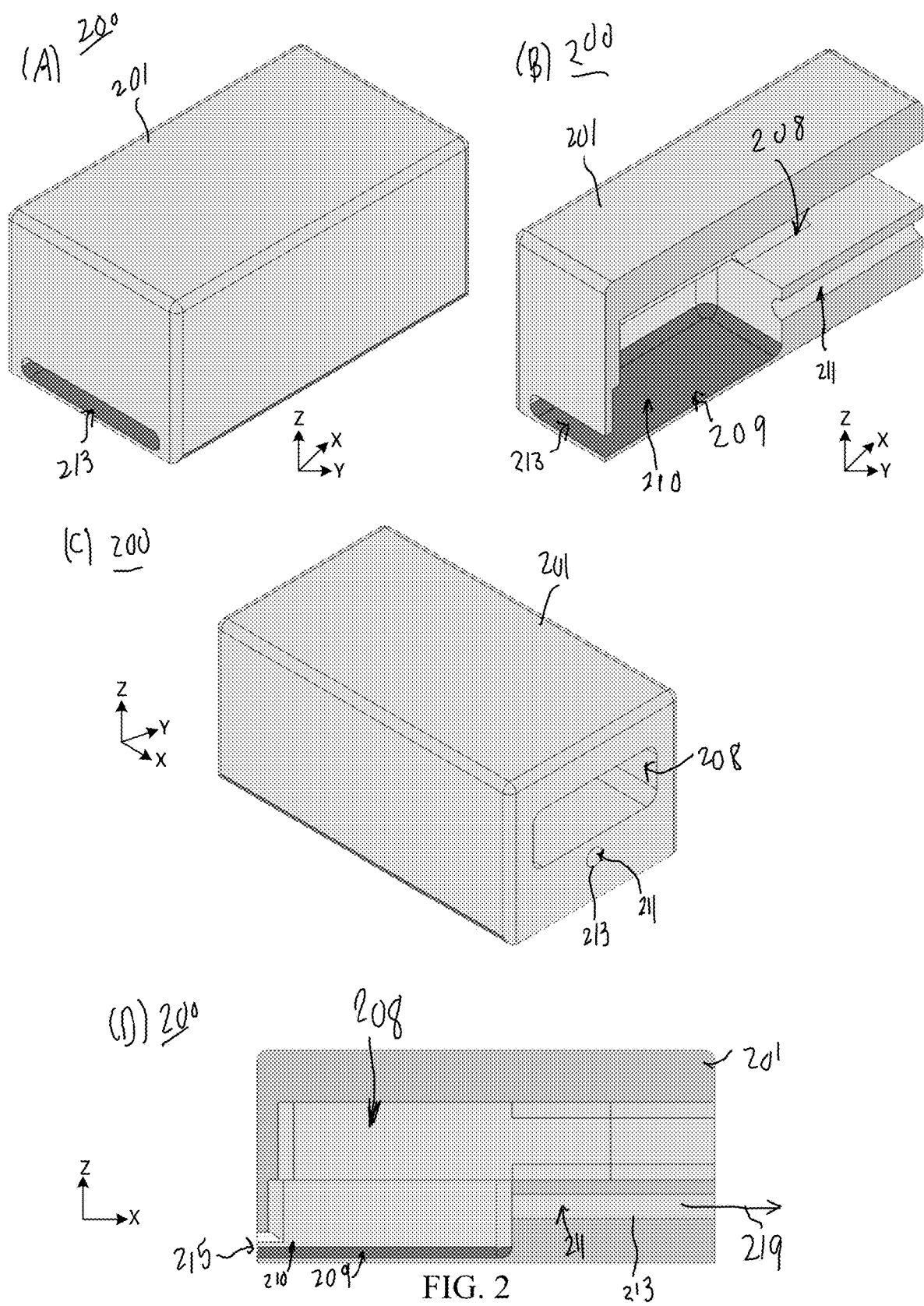
FIG. 2 shows an infrared thermal desorber in perspective views (panels A and C), in cut away view (panel B), and in cross-section in panel D.
Figure 3:
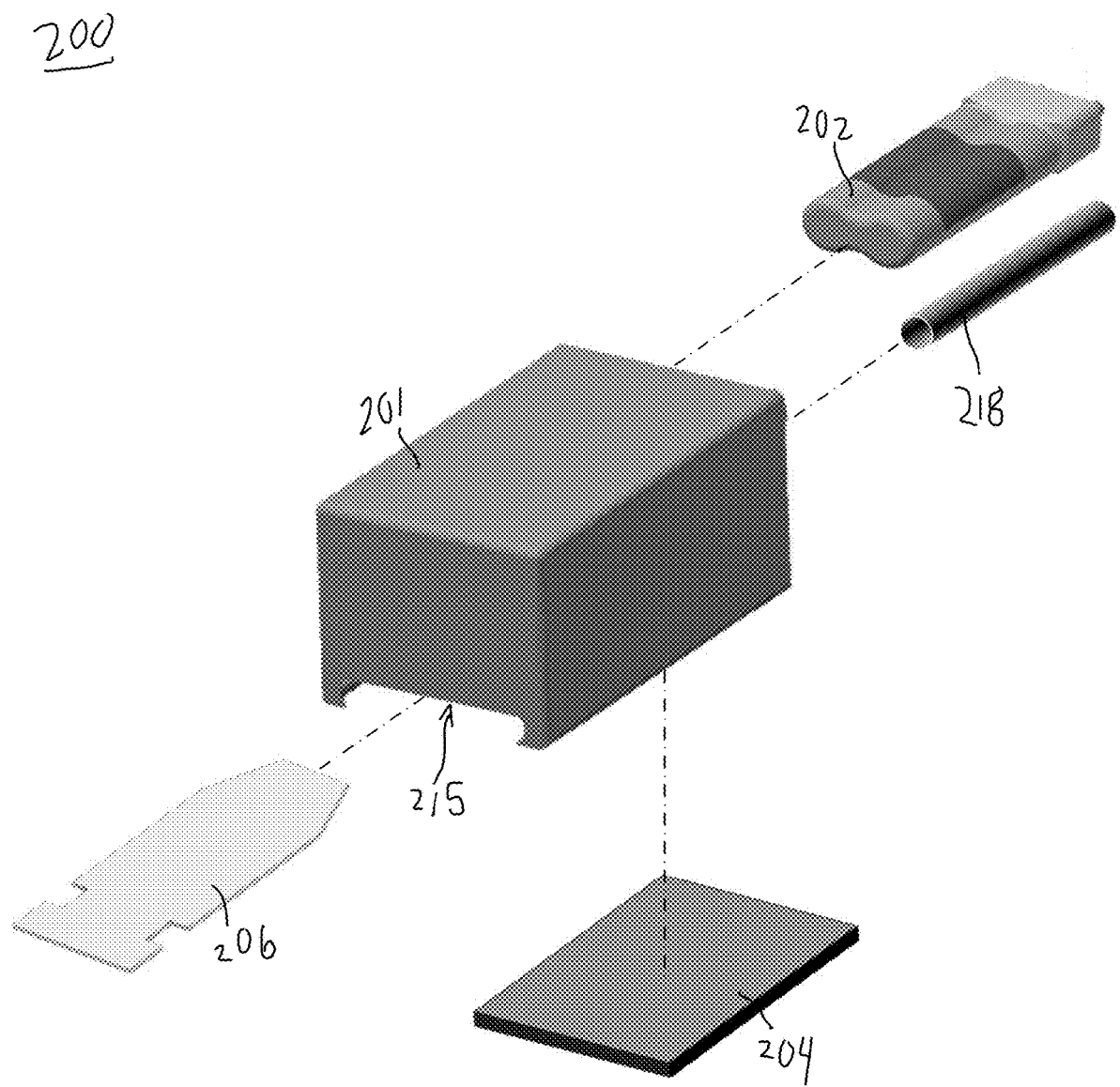
FIG. 3 shows an exploded view of an infrared thermal desorber.

A detailed description of one or more embodiments is presented herein by way of exemplification and not limitation.

It has been discovered that an infrared thermal desorber provides broad spectrum infrared radiation and thermal energy storage for high temperature desorption of an adsorbed analyte (e.g., a trace chemical) from wipe-acquired sample or directly from a target surface for chemical analysis. The infrared thermal desorber provides a temporally discrete and rapid (e.g., in seconds to tens of seconds) ramped heating profile that desorbs volatile compounds (without thermal degradation or decomposition) at an early time, lower temperature and nonvolatile compounds at a later time, elevated temperature. The infrared thermal desorber thermally desorbs analytes that can be unachievable by conventional devices or techniques over a wide range in compound volatility.

Infrared thermal desorber 200 performs infrared thermal desorption of adsorbed analyte 217 from analyte target 206. In an embodiment, with reference to FIG. 1 to FIG. 12, infrared thermal desorber 200 includes: desorption housing 201; infrared source receiver 208 disposed on desorption housing 201 and that receives infrared emission source 202 such that infrared emission source 202 produces primary infrared emission 203; infrared absorber receiver 209 disposed on desorption housing 201 and that receives infrared absorber 204, such that infrared absorber receiver 209 is in infrared communication with infrared emission source 202 so that infrared absorber 204 receives primary infrared emission 203 from infrared emission source 202, produces thermal energy emission 205 from primary infrared emission 203 in response to receipt of primary infrared emission 203, and communicates thermal energy emission 205 from infrared absorber 204; analyte target receiver 210 disposed on desorption housing 201 and that receives analyte target 206, such that analyte target receiver 210 is in thermal communication with infrared absorber 204 disposed in infrared absorber receiver 209 so that analyte target 206 receives thermal energy emission 205 from infrared absorber 204, desorbs adsorbed analyte 217 as volatilized analyte 207 from analyte target 206 in response to receipt of thermal energy emission 205 from infrared absorber 204, and communicates volatilized analyte 207 from analyte target 206; effluent communicator 211 disposed on desorption housing 201 in gas communication with analyte target 206 and including flow outlet 213 in gas communication with analyte target 206, such that effluent communicator 211 receives volatilized analyte 207 desorbed from analyte target 206 in response to analyte target 206 being subjected to thermal energy emission 205 from infrared absorber 204; and communicates volatilized analyte 207 through flow outlet 213 from desorption housing 201.

In an embodiment, infrared thermal desorber 200 includes infrared absorber 204 disposed on infrared absorber receiver 209, wherein infrared absorber 204 subjects analyte target 206 to thermal energy emission 205 such that a temperature of analyte target 206 increases in response to receipt of thermal energy emission 205 from infrared absorber 204, and analyte target 206 releases adsorbed analyte 217 disposed on analyte target 206 as volatilized analyte 207 in response to the increase of the temperature of analyte target 206.

In an embodiment, infrared thermal desorber 200 includes analyte target slot 215 disposed on desorption housing 201, wherein analyte target 206 is received by analyte target slot 215 for disposal on analyte target receiver 210. According to an embodiment, infrared thermal desorber 200 analyte target 206 is disposed on analyte target receiver 210, such that analyte target 206 receives thermal energy emission 205 from infrared absorber 204, and a temperature of analyte target 206 increases in response to receipt of thermal energy emission 205 from infrared absorber 204, wherein analyte target 206 releases adsorbed analyte 217 disposed on analyte target 206 as volatilized analyte 207 in response to the increase of the temperature of analyte target 206.

In an embodiment, analyte target receiver 210 is interposed between infrared source receiver 208 and infrared absorber receiver 209. According to an embodiment, analyte target 206 is disposed on analyte target receiver 210 and interposed between the infrared emission source 202 and the infrared absorber 204

In an embodiment, infrared absorber receiver 209 is interposed between infrared source receiver 208 and analyte target receiver 210. According to an embodiment, infrared absorber 204 is disposed on infrared absorber receiver 209 and interposed between infrared emission source 202 and analyte target 206. Analyte target receiver 210 can be disposed on an external surface of infrared absorber 204. Further, desorption housing 201 can move over a surface of analyte target 206 disposed on the external surface of desorption housing 201 so that desorption housing 201 can be arbitrarily repositionable over a selected portion of analyte target 206.

In an embodiment, infrared thermal desorber 200 includes gas sampling tube 218 in fluid communication with analyte target 206 and is disposed in effluent communicator 211 at flow outlet 213, such that gas sampling tube 218 receives volatilized analyte 207 from analyte target 206 and communicates volatilized analyte 207 in gas flow direction 219 from desorption housing 201.

In an embodiment, infrared thermal desorber 200 includes flow inlet 212 disposed on desorption housing 201 in fluid communication with flow outlet 213, such that flow inlet 212 receives background gas flow 216 so that background gas flow 216 entrains volatilized analyte 207 from analyte target 206 and communicates volatilized analyte 207 to effluent communicator 211.

In an embodiment, infrared thermal desorber 200 includes infrared transmissive gas partition 214 disposed on desorption housing 201 in infrared communication with infrared absorber 204, such that infrared transmissive gas partition 214 is transmissive to primary infrared emission 203 from infrared emission source 202, communicates primary infrared emission 203 from infrared emission source 202 to infrared absorber 204, and seals infrared emission source 202 from analyte target 206 so that volatilized analyte 207 from analyte target 206 does not contact infrared emission source 202.

In an embodiment, infrared thermal desorber 200 includes power source 223 in electrical communication with infrared emission source 202, such that power source 223 provides electrical power 224 to infrared emission source 202 from which infrared emission source 202 produces primary infrared emission 203.

In an embodiment, infrared thermal desorber 200 includes analyzer 226 in fluid communication with flow outlet 213, such that analyzer 226 receives volatilized analyte 207 from desorption housing 201, analyzes volatilized analyte 207, and produces gas analysis 227 from analysis of volatilized analyte 207 to determine a chemical composition or quantity of volatilized analyte 207.

In infrared thermal desorber 200, desorption housing 201 provides a mechanical structure for disposition of infrared emission source 202 for communication of primary infrared emission 203 to infrared emission source 202 and so that analyte target 206 is proximate to infrared emission source 202. Desorption housing 201 can have an arbitrary shape, e.g., cubic, spherical, ellipsoidal, and the like. The shape and size of desorption housing 201 can be configured to a selected application of infrared thermal desorber 200 for desorption of adsorbed analyte 217 from a particular format of analyte target 206. Desorption housing 201 can include a material that has material strength for deployment in a harsh environment or in a clinical or research setting. Exemplary materials of construction include a metal (e.g., aluminum, stainless steel, and the like), polymer (e.g., a thermoplastic), ceramic, glass, and the like. Elements (e.g., infrared source receiver 208, infrared absorber receiver 209, analyte target receiver 210, analyte target slot 215) for receiving various components (e.g., infrared emission source 202, infrared absorber 204, analyte target 206) can include a surface, slot, protrusion, protuberance, relief, and the like to mechanically engage, receive, contain, or hold such component. Moreover, these components can be rigidly or flexibly held in place on desorption housing 201 permanently or reversibly. The components can be removable for replacement of used components, especially analyte target 206, wherein different adsorbed analyte 217 can be sampled from different analyte target 206 in an absence of contamination from prior analyte target 206. Moreover, different infrared emission sources 202 can be used by replacing such in infrared source receiver 208 to provide, e.g., a different wattage or wavelength of primary infrared emission 203.

Figure 4:
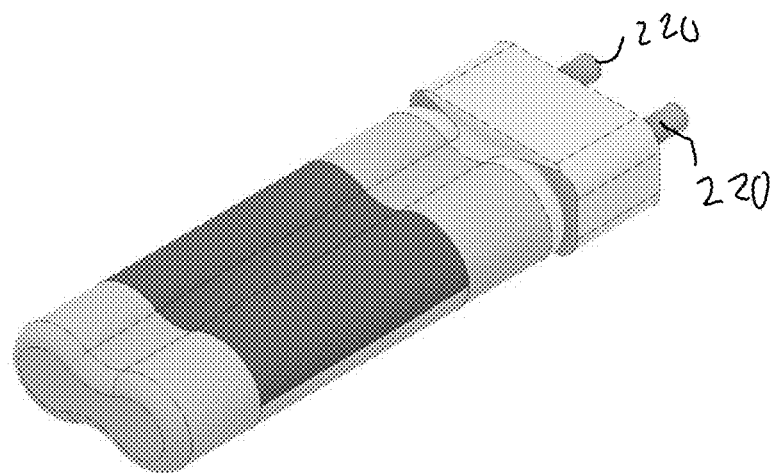
FIG. 4 shows a perspective view (panel A) and a side view (panel B) of an infrared emission source and a gas sampling tube in panel C.
Figure 4:
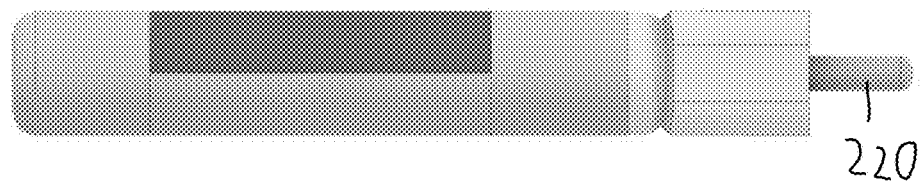
Figure 4:
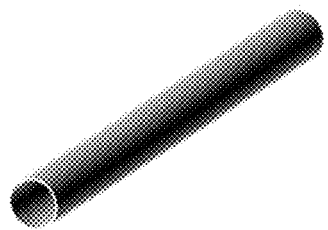
Figure 12:
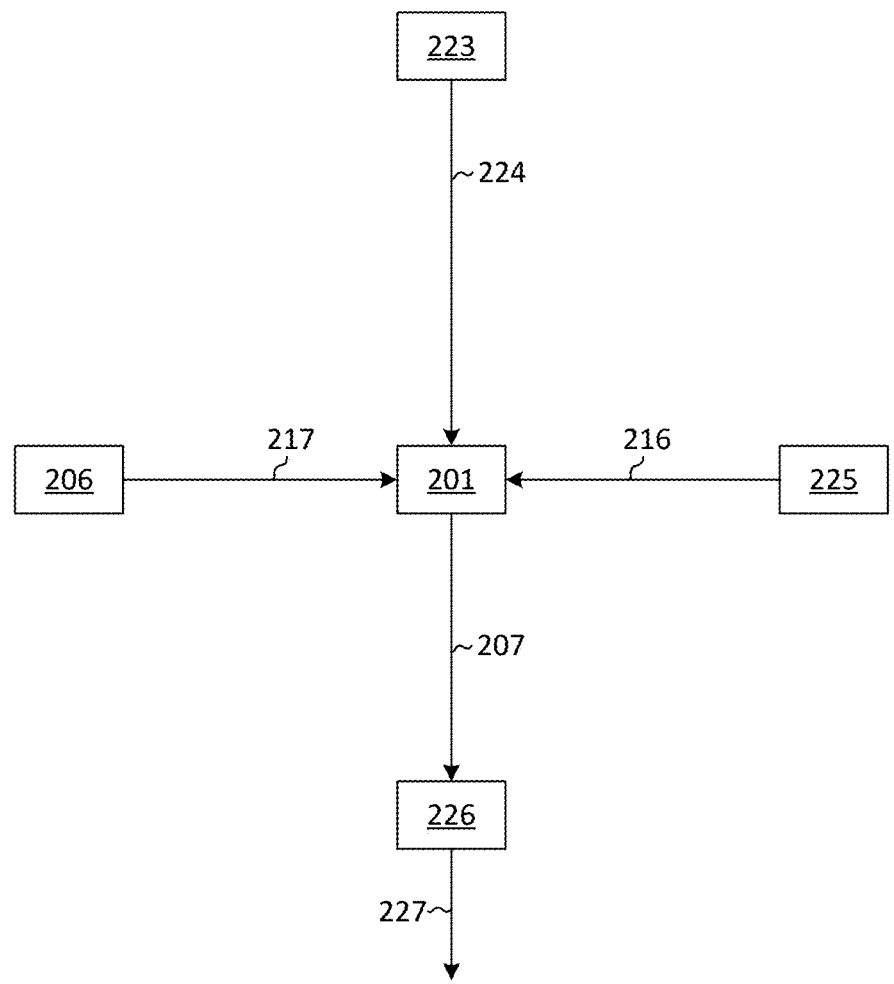
FIG. 12 shows an infrared thermal desorber.
Figure 13:
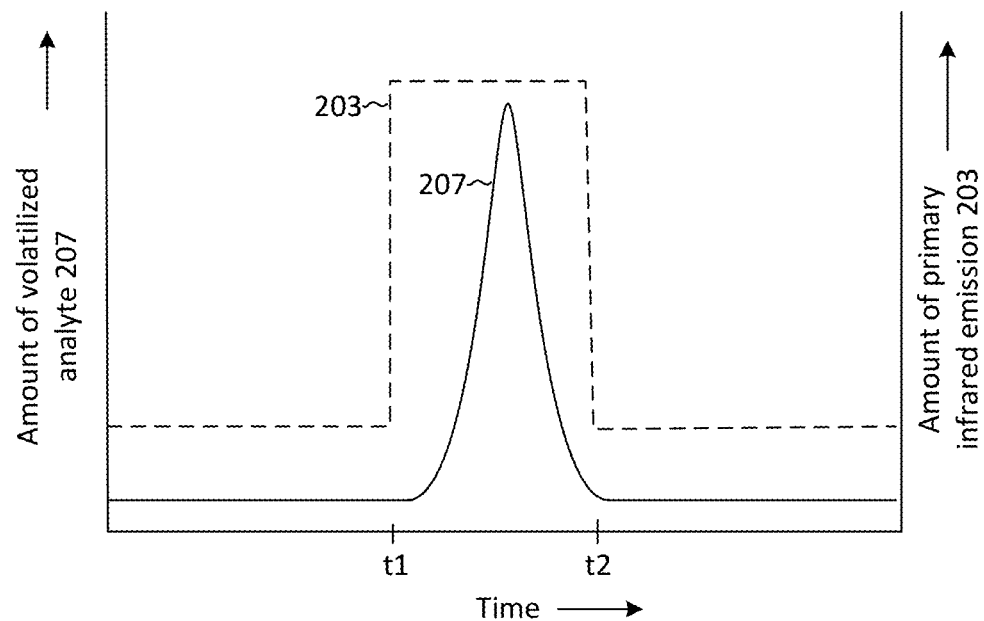
FIG. 13 shows a graph of an amount of a primary infrared emission and an amount of a volatilized analyte versus time.
Figure 17:
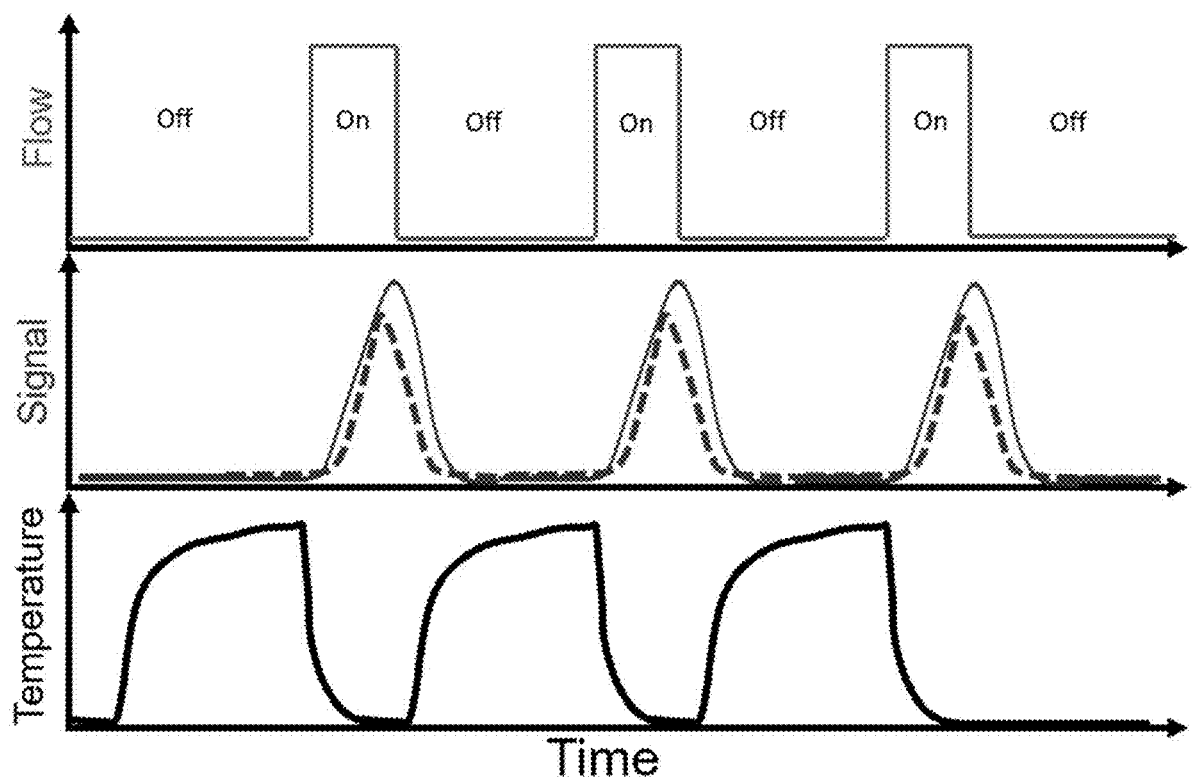
FIG. 17 shows graphs of flow, signal, and temperature versus time.

In an embodiment, infrared thermal desorber 200 includes infrared emission source 202 disposed on infrared source receiver 208 in infrared line-of-sight with infrared absorber 204, wherein infrared emission source 202 selectively produces primary infrared emission 203 With reference to FIG. 4, infrared emission source 202 can be a twin tube near-infrared emitter that can be approximated as a blackbody at 2200° C. filament temperature. Moreover, infrared emission source 202 can include a broad-spectrum infrared emitter with varying spectral distributions or response times. An exemplary infrared emission source 202 is a quartz lamp. Infrared emission source 202 can be operated continuously or modulated in an on-and-off pattern that can be provided by a selected waveform controlled by electrical power 224 supplied to electrical contact 220 of infrared emission source 202, e.g., infrared emission source 202 from power source 223, as shown in FIG. 12, FIG. 13, and FIG. 17. Power source 223 provides variation of power level sent to infrared emission source 202 and duration of emission.

Primary infrared emission 203 from infrared emission source 202 can have a wavelength from 900 nm to 10,000 nm, specifically from 1000 nm to 7500 nm, and more specifically from 1000 nm to 5000 nm. The wavelength can be selected to provide a heating profile tailored to a particular infrared absorber 204. A duty cycle of primary infrared emission 203 can be from 0% to 100%, based on an amount of time for emission of infrared emission source 202. It is contemplated that the duty cycle is from 0.1% to 95%, specifically from 1% to 50%, and more specifically from 10% to 50%. An average power of primary infrared emission 203 at infrared absorber 204 can be from 1 microwatt ($\mu$W) to 1 kilowatts (kW), specifically from 1 mW to 500 W, and more specifically from 1 W to 100 W.

Figure 5:
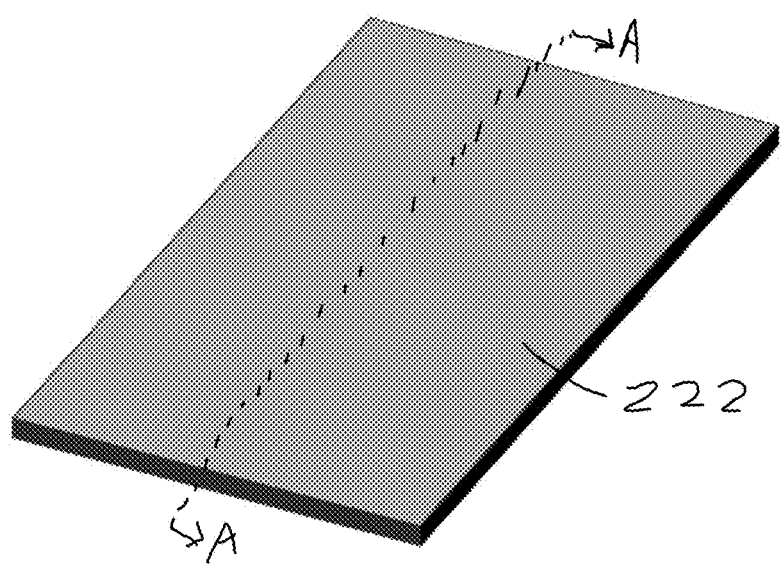
FIG. 5 shows a perspective view (panel A) and a side view (panel B) of an infrared absorber that includes an infrared absorption area on all surfaces of the infrared absorber; and a perspective view (panel C) and a side view (panels D and E) of an infrared absorber that includes an infrared absorption area on a substrate of the infrared absorber.
Figure 5:
Figure 5:
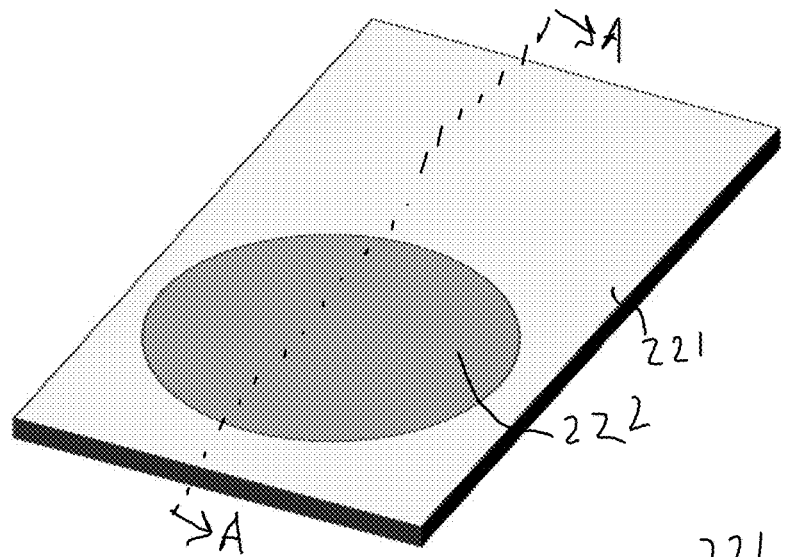
Figure 5:
Figure 5:
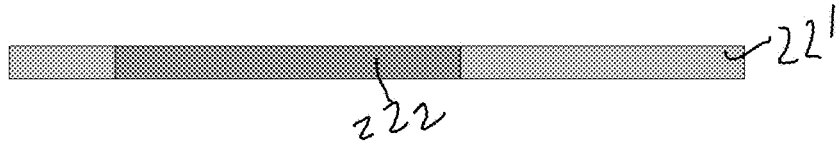
Figure 6:
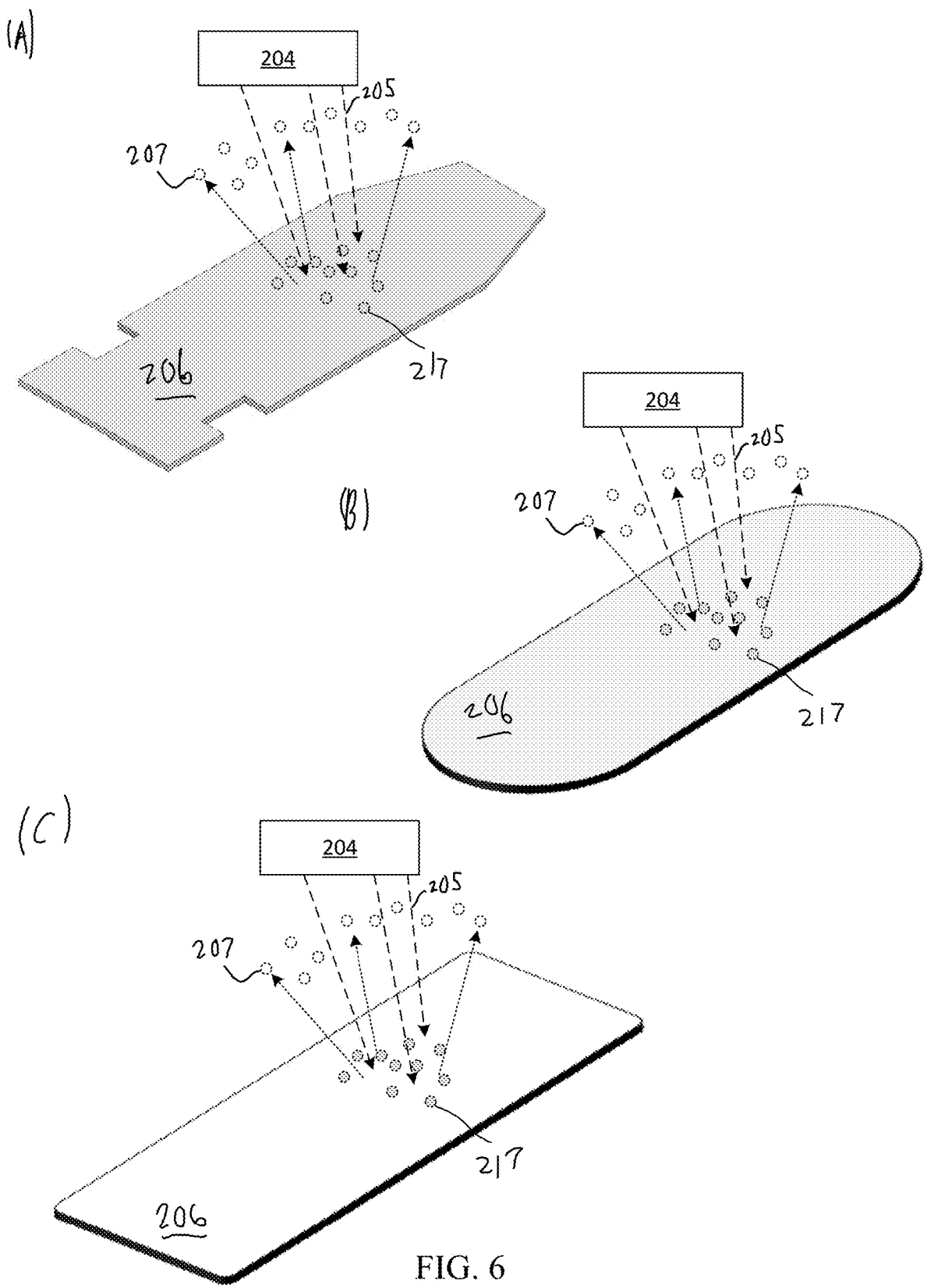
FIG. 6 shows an analyte target with different shapes in panels A, B, and C.
Figure 7:
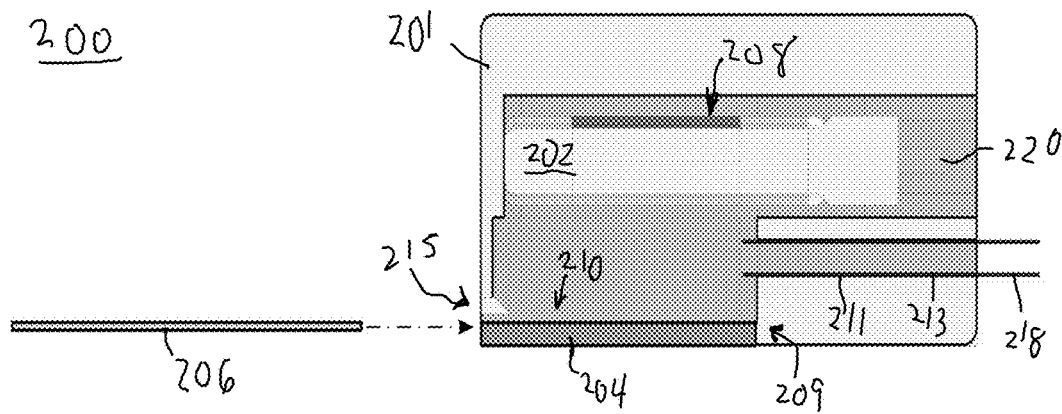
FIG. 7 shows an infrared thermal desorber before disposal of an analyte target in a desorption housing (panel A), during production of primary infrared emission 203 (panel B), and during production of a volatilized analyte by the analyte target (panel C)
Figure 7:
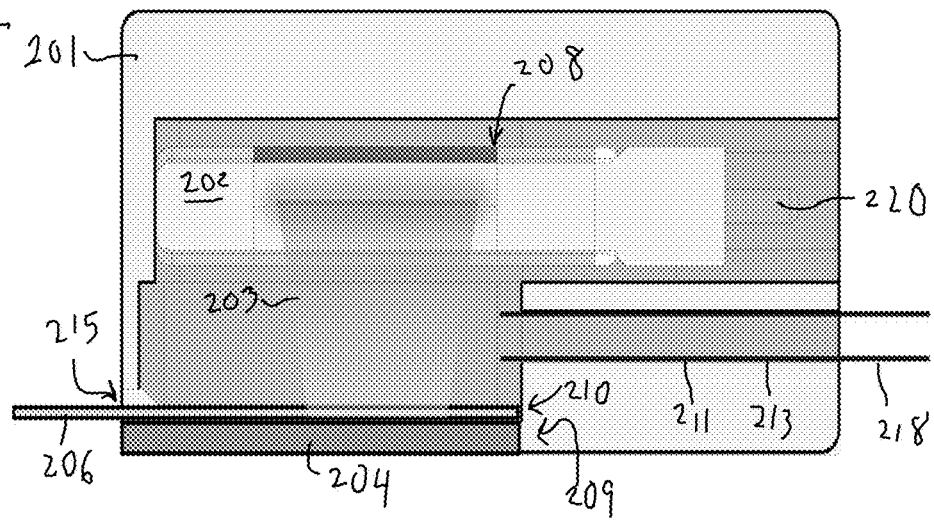
Figure 7:
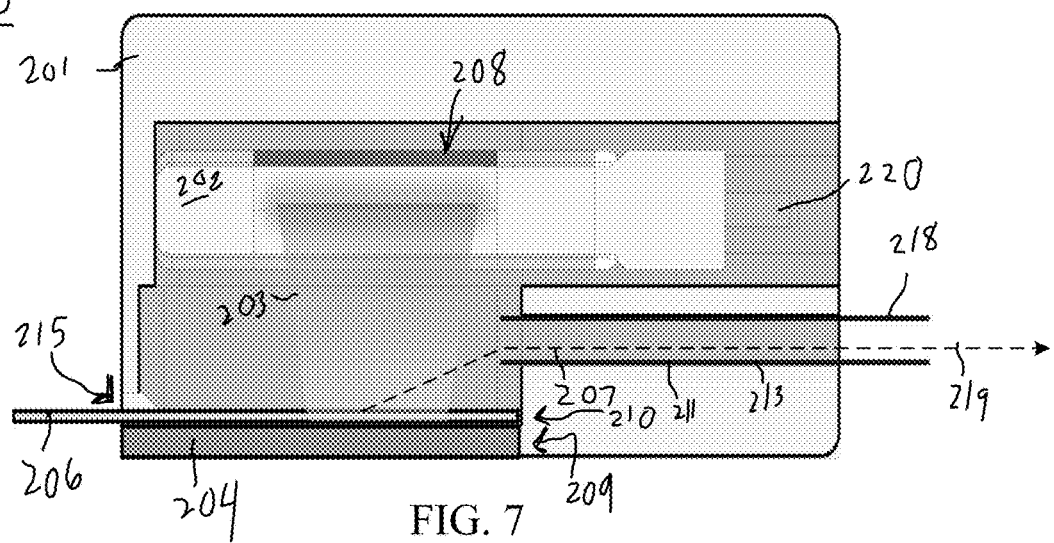
Figure 8:
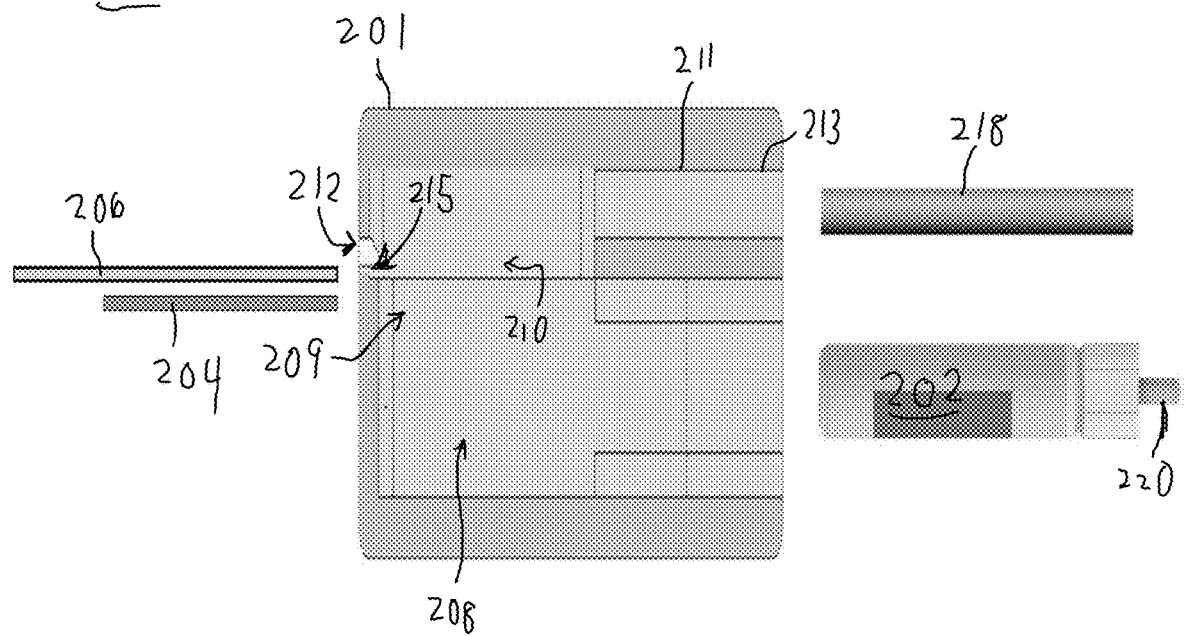
FIG. 8 shows an exploded view of an infrared thermal desorber (panel A); and the infrared thermal desorber in panel B.
Figure 8:
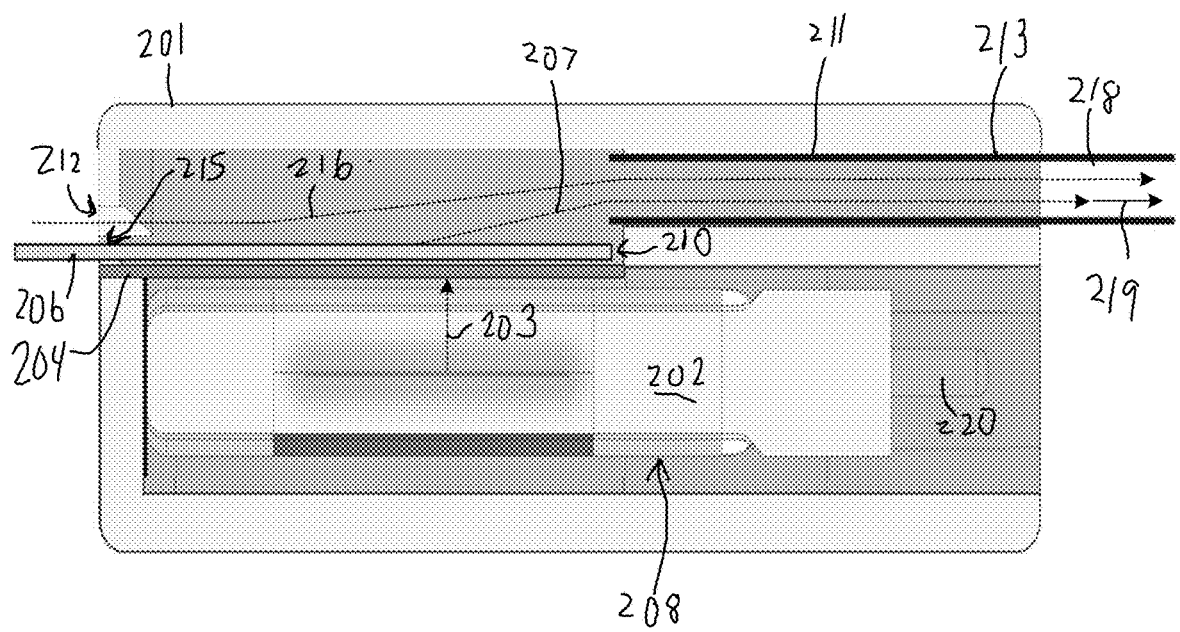
Figure 9:
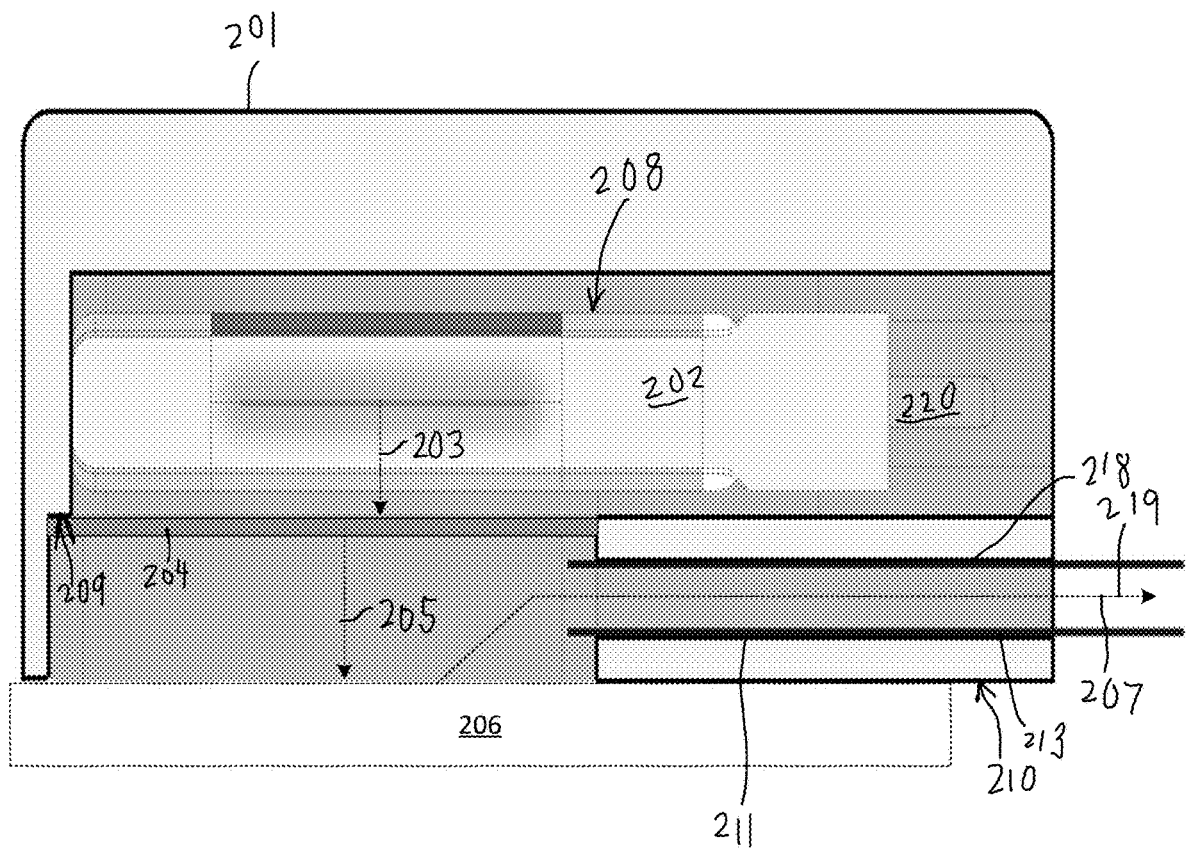
FIG. 9 shows an infrared thermal desorber.

Infrared absorber 204 receives primary infrared emission 203 and produces thermal energy emission 205 from primary infrared emission 203. Various formats of infrared absorber 204 are shown in FIG. 5. It is contemplated that infrared absorber 204 can be a thermal energy storage plate or component that includes infrared absorption area 222 over a complete surface or body of infrared absorber 204 (FIG. 5A) or a thermal energy storage insert disposed on substrate 221 (FIG. 5B). A material, thickness, or size (using an insert instead of full plate) can be used to provide a selectively tailored heating profile, temperature achieved, and response (e.g., a rate of heating or cooling) of infrared absorber 204. Exemplary materials for infrared absorber 204 include metal, plastic, glass, ceramic, and the like that absorb primary infrared emission 203 to produce thermal energy emission 205. In an embodiment, the material is glass-mica ceramic. Infrared absorber 204 can have an arbitrary shape and size configured to a selected application of infrared thermal desorber 200 for desorption of adsorbed analyte 217 from a particular format of analyte target 206.

Thermal energy emission 205 from infrared absorber 204 can have conduction, convection, and radiation components. The radiative component of thermal energy emission 205 from infrared absorber 204 can have a wavelength from 900 nm to 15,000 nm, specifically from 5000 nm to 14,000 nm, and more specifically from 7000 nm to 13,000 nm. The wavelength can be selected to provide a heating profile tailored to a particular analyte target 206. A duty cycle of thermal energy emission 205 can be from 0% to 100%, based on an amount of time for emission of infrared emission source 202. It is contemplated that the duty cycle is from 0.1% to 95%, specifically from 1% to 50%, and more specifically from 10% to 50%. An average power of thermal energy emission 205 at analyte target 206 can be from 1 microwatt ($\mu$W) to 1 kilowatts (kW), specifically from 1 mW to 500 W, and more specifically from 1 W to 100 W. Accordingly, during operation of infrared thermal desorber 200, a temperature of infrared absorber 204 can be from $-20°$ C. to $1000°$ C., specifically from $10°$ C. to $800°$ C., and more specifically from $20°$ C. to $600°$ C.

Figure 10:
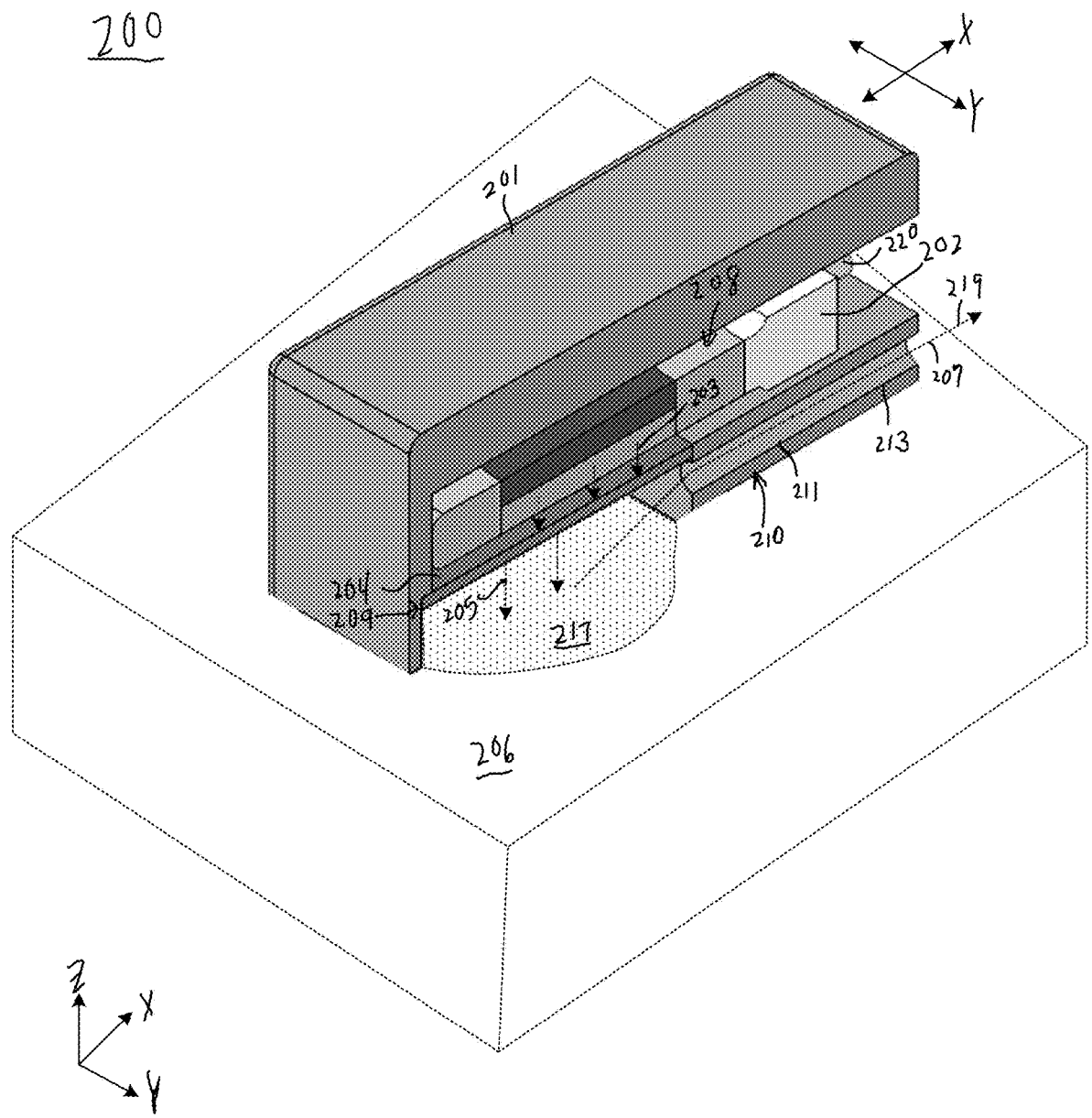
FIG. 10 shows an infrared thermal desorber with an analyte target disposed on an external surface (as an analyte target receiver) of a desorption housing.

Analyte target 206 includes adsorbed analyte 217 that is desorbed as volatilized analyte 207 in response to receipt of thermal energy emission 205 from infrared absorber 204. A material, thickness, or size of analyte target 206 can be used with desorption housing 201. It is contemplated that analyte target 206 can be wipe material that is inserted into desorption housing 201 as shown in FIG. 1, FIG. 3, FIG. 6, FIG. 7, FIG. 8, and FIG. 9. Wipes of analyte target 206 can include material, e.g., polytetrafluoroethylene (PTFE)-coated fiberglass weave wipe, that transmits primary infrared emission 203. In an embodiment, analyte target 206 absorbs primary infrared emission 203. Exemplary materials for analyte target 206 include PTFE-coated fiberglass, aramid (e.g., meta-aramid material commercially available as NOMEX), glass fiber filter, muslin, acetate paper, metal mesh, and the like that absorb thermal energy emission 205 to produce volatilized analyte 207. With reference to FIG. 10, analyte target 206 can be an item on which desorption housing 201 is disposed. In this regard, analyte target 206 can be an object over which infrared thermal desorber 200 can be scanned so that several locations over a surface of analyte target 206 can be subjected to performing infrared thermal desorption. Accordingly, analyte target 206 can be luggage, textiles, electronics, food items, and the like.

Adsorbed analyte 217 can include a compound or composition that includes species that are volatile or non-volatile at room temperature and can be a fluid or solid. The compound can be organic or inorganic. Exemplary adsorbed analytes include biological molecules (proteins, amino acids, and DNA, RNA, and the like), energetic materials, explosive compounds, toxins, narcotics, dyes, chemical tracers, and the like. A molecular weight of the compound can be from 1 dalton (Da) to 1 megadalton (MDa), specifically from 10 Da to 100 kDa, and more specifically from 50 Da to 1 kDa. A number of density of adsorbed analyte 217 on analyte target 206 can be from 10/cm' to $10^{10}$/cm$^2$, specifically from $10^3$/cm$^2$ to $10^9$/cm', and more specifically from $10^5$/cm' to $10^8$/cm'. It should be appreciated adsorbed analyte 217 is rapidly desorbed as volatilized analyte 207 without conversion (i.e., fragmentation, reaction, and the like) of adsorbed analyte 217, wherein a chemical speciation of volatilized analyte 207 is identical to adsorbed analyte 217. A desorption time for volatilized analyte 207 from initial exposure of analyte target 206 to thermal energy emission 205 can be from 1 millisecond (ms) to 100 seconds (s), specifically from 500 ms to 30 s, and more specifically from 500 ms to 20 s.

Effluent communicator 211 is a flow channel that communicates volatilized analyte 207 from analyte target 206 out of desorption housing 201, e.g., to analyzer 226 for analysis. A conductance of effluent communicator 211 can be selected based on a length, cross-section shape or size, and curvature of effluent communicator 211. Restricted flow or free-flow of volatilized analyte 207 through effluent communicator 211 can occur based on selection of a sampling rate that can be affected through physical properties or modification of such of effluent communicator 211. A flow rate of volatilized analyte 207 through effluent communicator 211 is sufficient for analysis of volatilized analyte 207 and can be provided to not damage, contaminate, or accumulate volatilized analyte 207 in desorption housing 201 or effluent communicator 211. Effluent communicator 211 can receive various elements such as gas sampling tube 218 as shown in FIG. 1, FIG. 3, FIG. 4C, FIG. 7, FIG. 8, and FIG. 9 or a pump for either suction out of desorption housing 201 or pressure-driven flow through desorption housing 201. Gas sampling tube 218 can be detachable or permanently disposed in effluent communicator 211 to provide a flow path from desorption housing 201 for volatilized analyte 207 and can optionally filter selected species, particles, or debris from communication into or out of desorption housing 201. Moreover, gas sampling tube 218 has a length that can be from centimeters to meters that communicates volatilized analyte 207 out of desorption housing 201 to analyzer 226 and can include materials selected for a temperature of operation of infrared thermal desorber 200.

Flow outlet 213 is an exit portion of effluent communicator 211 to which gas sampling tube 218 can mechanically engage. Flow inlet 212 can be included in infrared thermal desorber 200 to provide background gas flow 216 in desorption housing 201. The background gas can be inert with respect to components of infrared thermal desorber 200, adsorbed analyte 217, and volatilized analyte 207. Exemplary background gases include nitrogen, argon, atmospheric air, and the like.

Figure 11:
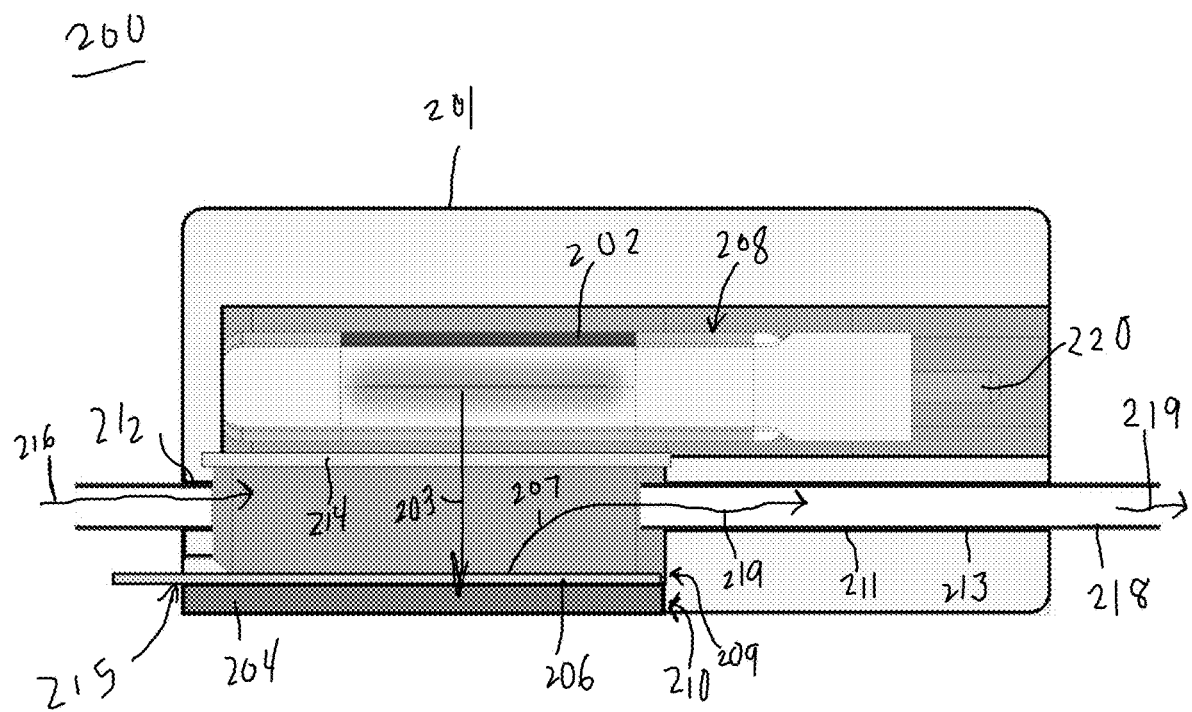
FIG. 11 shows an infrared thermal desorber with an infrared transmissive gas partition interposed between an infrared emission source and an analyte target.

Infrared transmissive gas partition 214 seals a desorption region (e.g., including infrared absorber 204 and analyte target 206) of desorption housing 201 from infrared emission source 202, wherein primary infrared emission 203 transmits through infrared transmissive gas partition 214 to be received by infrared absorber 204 as shown in FIG. 11. Pressure-driven flow can push gas through desorption housing 201 and out effluent communicator 211, which differs provision of suction to an interior of desorption housing 201. Exemplary materials for infrared transmissive gas partition 214 include glass and the like.

Analyzer 226 receives volatilized analyte 207 from desorption housing 201. Exemplary analyzers 226 include an analytical instrument such as a mass spectrometer, ion mobility spectrometer, particle size analyzer, and the like. Analyzer 226 performs analysis on volatilized analyte 207 and provides gas analysis 227 therefrom. Gas analysis 227 can include a composition, size distribution, chemical species, mass spectrum, chromatogram, and the like of volatilized analyte 207.

Infrared thermal desorber 200 can be made in various ways. It should be appreciated that infrared thermal desorber 200 includes a number of optical, electrical, or mechanical components, wherein such components can be interconnected and placed in communication (e.g., optical communication, electrical communication, fluid communication, mechanical communication, and the like) by physical, chemical, optical, or free-space interconnects. The components can be disposed on mounts that can be disposed on a bulkhead for alignment or physical compartmentalization. As a result, infrared thermal desorber 200 can be disposed in a terrestrial environment or space environment.

In an embodiment, a process for making infrared thermal desorber 200 includes: receiving infrared emission source 202 in desorption housing 201 by press fit, interference fit, fixed fit, sliding fit held in place by mechanical fastener (e.g., screw), and the like; receiving infrared absorber 204 in desorption housing 201 so that infrared emission source 202 is in infrared communication with infrared absorber 204 by press fit, interference fit, fixed fit, clearance fit held in place by mechanical fastener (e.g., screw, clips), permanent fastening by adhesive, and the like; receiving gas sampling tube 218 in effluent communicator 211 by press fit, interference fit, fixed fit, sliding fit, adhesive, and the like; connecting infrared emission source 202 to power source 223 by electrical connection and the like; and receiving analyte target 206 by desorption housing 201 so that analyte target 206 is in thermal communication with infrared absorber 204 by clearance fit (e.g., free running, close running fit) and the like.

The process for making infrared thermal desorber 200 also can include receiving infrared transmissive gas partition 214 in desorption housing 201 by press fit, interference fit, fixed fit, sliding fit, adhesive, and the like.

Infrared thermal desorber 200 and processes disclosed herein have numerous beneficial uses. In an embodiment, a process for performing infrared thermal desorption with infrared thermal desorber 200 includes: producing, by infrared emission source 202, primary infrared emission 203 by communicating electrical power 224 by power source 223 through a filament; receiving, by infrared absorber 204, primary infrared emission 203 from infrared emission source 202 by absorbance of irradiation based on infrared absorber 204 material absorptivity; producing, by infrared absorber 204, thermal energy emission 205 from primary infrared emission 203 in response to receipt of primary infrared emission 203 by increasing infrared absorber 204 internal energy (e.g., heating); communicating thermal energy emission 205 from infrared absorber 204 by conduction, convection, and radiation; receiving, by analyte target 206, thermal energy emission 205 from infrared absorber 204 by conduction, convection, and radiation; desorbing adsorbed analyte 217 as volatilized analyte 207 from analyte target 206 in response to receipt of thermal energy emission 205 by analyte target 206 from infrared absorber 204 by vaporization, sublimation, melting, boiling, aerosolization, and the like; communicating volatilized analyte 207 from analyte target 206 by diffusion, advection, entrainment with bulk gas flow, and the like; receiving, by effluent communicator 211, volatilized analyte 207 desorbed from analyte target 206 in response to analyte target 206 being subjected to thermal energy emission 205 from infrared absorber 204 by diffusion, advection, entrainment with bulk gas flow, and the like; and communicating volatilized analyte 207 through flow outlet 213 from desorption housing 201 by diffusion, advection, entrainment with bulk gas flow, suction, pressure-driven flow, and the like to perform infrared thermal desorption.

Performing infrared thermal desorption can include receiving analyte target 206 by analyte target slot 215 disposed on desorption housing 201 by manual insertion, automated (e.g., robotic) mechanical insertion, and the like.

Performing infrared thermal desorption can include moving desorption housing 201 over a surface of analyte target 206 disposed on an external surface of desorption housing 201 by manual hand-held motion, automated mechanical motion, and the like; and arbitrarily repositioning desorption housing 201 over a selected portion of analyte target 206 by manual means, automated means, and the like.

Performing infrared thermal desorption can include receiving background gas flow 216 in desorption housing 201 by mechanical pump, pressurized gas, or the like; entraining volatilized analyte 207 from analyte target 206 in background gas flow 216 by advective and diffusive transport; and communicating volatilized analyte 207 entrained in background gas flow 216 to effluent communicator 211 by advective and diffusive transport.

Performing infrared thermal desorption can include communicating volatilized analyte 207 from effluent communicator 211 to analyzer 226 by advective gas flow; receiving volatilized analyte 207 by analyzer 226 by pressure-driven flow, suction, ionization and ion transport, or the like; analyzing, by analyzer 226, volatilized analyte 207 by molecular sensing, colorimetry, ionization, ion mobility, time-of-flight, quadrupole, ion trap, magnetic sector, or the like; producing, by analyzer 226, gas analysis 227 of volatilized analyte 207 by ion mobility spectra, mass spectra, and the like; and determining a chemical composition or quantity of volatilized analyte 207 by elemental composition, fragmentation, library matching, and the like.

In an embodiment, infrared thermal desorber 200 includes desorption housing 201, a twin tube near-infrared emitter as infrared emission source 202 (approximated as blackbody at 2200° C. filament temperature), and a glass-mica ceramic insulator base plate as infrared absorber 204. Polytetrafluoroethylene (PTFE)-coated fiberglass weave wipe material can be used as analyte target 206. Infrared emission source 202 is disposed in desorption housing 201 and emits primary infrared emission 203 toward and directly at the analyte target 206 and infrared absorber 204. In this arrangement, analyte target 206 is directly subjected to primary infrared emission 203. Adsorbed analyte 217 can be a wide variety of species. Conventional devices lack a radiative heating source that targets all spectral absorption wavelengths. Advantageously, infrared thermal desorber 200 and performing infrared thermal desorption provide high infrared transmission of analyte target 206 (e.g., PTFE-coated fiberglass) and thermal absorption and energy storage properties of infrared absorber 204 (e.g., with receipt of primary infrared emission 203 on glass-mica). As the infrared emission interval (e.g., during several seconds) begins, primary infrared emission 203 transmits through analyte target 206 on which is disposed adsorbed analyte 217 and is received by infrared absorber 204, wherein a sufficient fraction of primary infrared emission 203 is absorbed and heats infrared absorber 204, which subsequently heats analyte target 206 by thermal energy emission 205 and adsorbed analyte 217 by conduction and convection. Materials of infrared absorber 204, e.g., glass-mica, provide a unique combination of infrared absorption and heat retention without melting or decomposing. Glass-mica has a rapid heating profile that provides these capabilities. Similarly, glass-mica rapidly cools under background gas flow 216 that entrains volatilized analyte 207 following an end of the emission interval for primary infrared emission 203. In certain embodiments, PTFE-coating on analyte target 206 can melt if analyte target 206 or desorption housing 201 gets too hot. According to an embodiment, rather than PTFE-coating, another material (e.g., metal mesh, glass fiber filter, and the like) for analyte target 206 with similar infrared transmission properties and higher operating temperatures is used.

Figure 14:
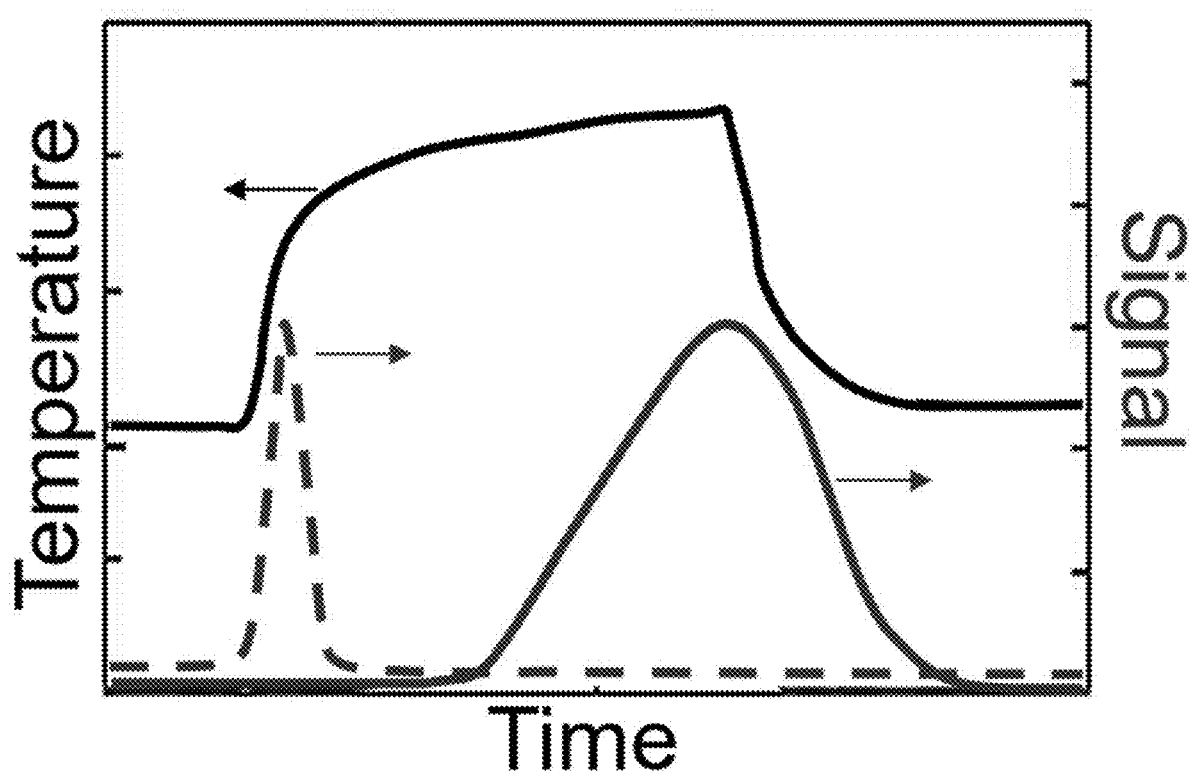
FIG. 14 shows a graph of temperature and signal versus time.

In this manner, with reference to FIG. 13 and FIG. 14, infrared thermal desorber 200 provides desorption of adsorbed analyte 217, wherein a temperature of infrared absorber 204 is shown as the upper curve in the graph in FIG. 14; signal from a more volatile compound in volatilized analyte 207 that is desorbed early at relatively lower temperatures is shown as the dashed curve, and signal from a less volatile compound of volatilized analyte 207 that is desorbed later in the heating profile at relatively higher temperatures is shown as the lower solid curve. The signal could be from analyzer 226 such as a mass spectrometer, ion mobility spectrometer, or another analytical instrument.

Figure 15:
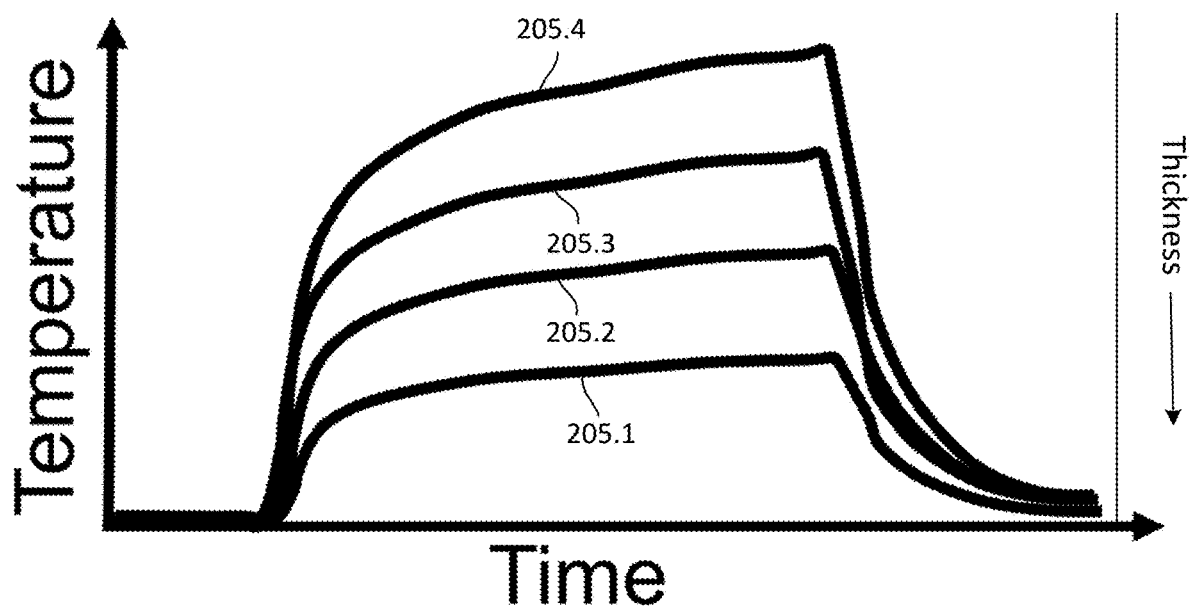
FIG. 15 shows a graph of temperature versus time.

In an embodiment, with reference to FIG. 15, various thickness of infrared absorber 204 is used to control thermal heating of infrared absorber 204 and production of thermal energy emission 205. Here, temperature profiles of infrared absorber 204 increase as the thickness of infrared absorber 204 decreases or when a size of infrared absorption area 222 on substrate 221 of infrared absorber 204 decreases. Further, various glass-mica ceramic materials (e.g., commercially available under tradenames: MYKROY, MYCALEX, MACOR, MICAVER) provide different infrared absorption, heating profiles (heat-up and cool-down times), or maximum temperatures.

Figure 16:
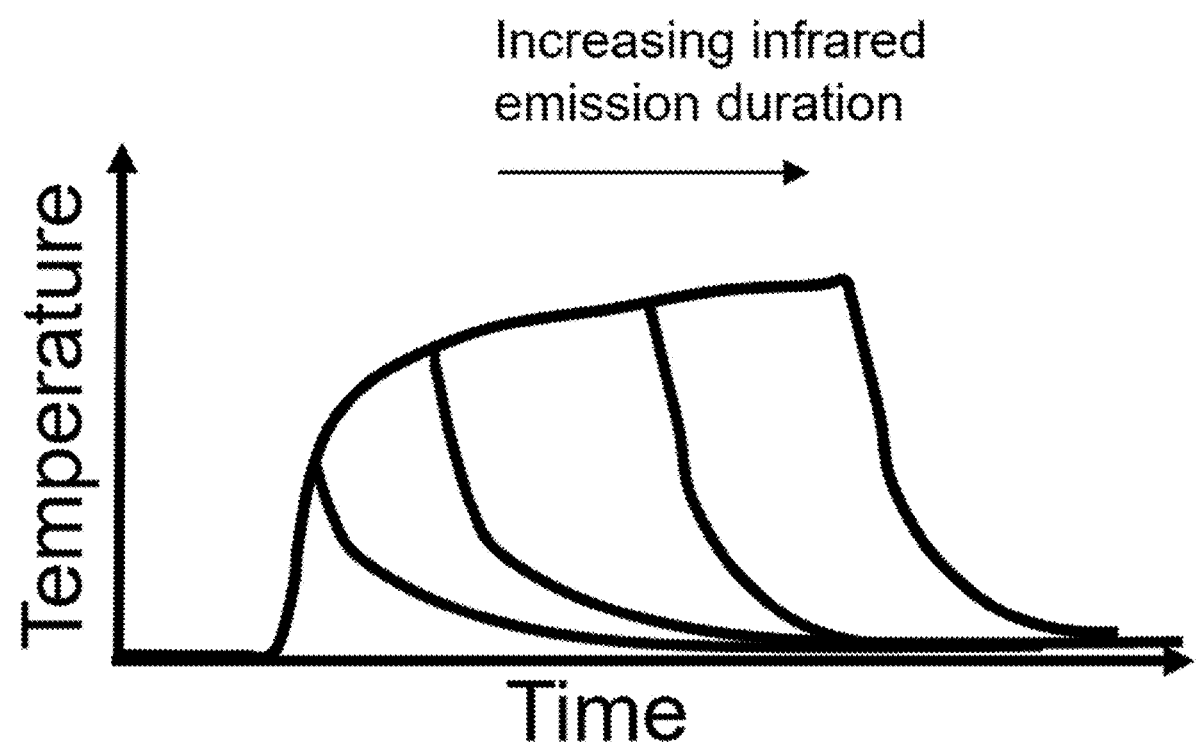
FIG. 16 shows graphs of temperature versus time.

In an embodiment, with reference to FIG. 16, a power level and emission duration of infrared emission source 202 is varied to change the heating profile of infrared absorber 204 and maximum temperatures and production of thermal energy emission 205. Various lamps for infrared emission source 202 with different spectral emission (near-infrared to mid-infrared) and different effective blackbody temperatures give different heating profiles, temperatures, and production of thermal energy emission 205.

In an embodiment, with reference to FIG. 17, pulsing background gas flow 216 provides a gas pocket to heat and concentrate volatilized analyte 207 to increase detection of volatilized analyte 207.

It should be appreciated that infrared thermal desorber 200 and performing infrared thermal desorption herein described provide thermal desorption of organic and inorganic explosives, pyrotechnics, and explosive powders, coupled with mass spectrometry (MS) chemical detection. Infrared thermal desorber 200 and processes herein can be coupled with trace chemical detection platforms (e.g., ion mobility spectrometry (IMS)). Infrared thermal desorber 200 and performing infrared thermal desorption can include indirect infrared thermal desorption and semi-remote sampling probe infrared thermal desorption systems and can be configured for coupling with MS, IMS, and other chemical detection methods.

Infrared thermal desorber 200 and performing infrared thermal desorption include broad spectrum infrared radiation and thermal energy storage for high temperature thermal desorption of trace chemicals. Thermal desorption can occur from wipe-collected sample or directly from target surfaces for subsequent chemical analysis by typical detection schemes (e.g., mass spectrometry, ion mobility spectrometry, molecular sensing, or colorimetric). These infrared thermal desorption (IRTD) systems generate inherent temporally discrete and rapid (about seconds to tens of seconds) ramped heating profiles that effectively desorb chemical species at their optimal temperatures. Volatile species can desorb at lower temperatures early in the emission interval, while refractory inorganic and nonvolatile species can desorb at elevated temperatures achieved late in the emission interval.

Infrared thermal desorber 200 and performing infrared thermal desorption benefit trace contraband detection (e.g., explosives, narcotics, chemical warfare agents, and the like) for security screening and in the field that can be useful for defense, physical security, customs and border patrol, transportation security, law enforcement, or forensic science. Certain analytes can include nonvolatile refractory inorganic oxidizers. Conventional chemical detection systems include thermal desorption of wipe-collected analytes but are technically deficient because the conventional devices may not achieve a temperature for desorption of these nonvolatile species. Conventional systems use resistive heating of thermal masses at a constant temperature that can have difficulty with compounds of vastly different chemical properties such as volatility, vapor pressure, or melting or boiling point. Conventional systems designed for organic explosive and narcotic compounds operate at temperatures insufficient to thermally desorb low vapor pressure refractory salts, most notably chlorate and perchlorate salts. Comparable difficulties arise with significantly raising the steady-state temperature of thermal desorption, specifically the thermal decomposition or degradation of labile species. Infrared thermal desorber 200 and performing infrared thermal desorption overcomes these technical deficiencies. In addition to screening applications, infrared thermal desorber 200 vaporizes, for subsequent detection, organic and inorganic species and provides characterizing pyrotechnics, propellants, and powders.

Infrared thermal desorber 200 and performing infrared thermal desorption can include indirect infrared thermal desorption, wherein components of infrared thermal desorber 200 are arranged such that infrared emission source 202 is disposed on a thinner energy storage plate (e.g., glass-mica) and emits toward infrared emission source 202. Here, analyte target 206 is inserted on rapidly heated infrared absorber 204, e.g., a glass-mica energy storage plate. Conduction through infrared absorber 204 provides a fast temporal response. Moreover, the infrared transmission properties of analyte target 206 is not restricted and solve the problems and technical limitation of conventional devices described above. Here, infrared emission source 202 separates from volatilized analyte 207 and eliminates contamination, fouling, and the like as well as exposure of a user to infrared irradiation (203, 205).

In an embodiment, infrared thermal desorber 200 and performing infrared thermal desorption include an indirect configuration that can be used for direct sampling of target surfaces (e.g., packages, luggage, vehicles, cargo, and the like) in a semi-remote sampling probe configuration. Infrared emission source 202 is isolated from the environment by infrared absorber 204 that is disposed in a cavity that is open to the ambient environment. The emission intervals and infrared power levels can be manipulated to provide a heating profile or duration for materials and thermal properties of analyte target 206 and adsorbed analyte 217. Desorption housing 201 hovers over the target surface of analyte target 206 during an emission interval, providing a heated gas pocket in contact with the hot infrared absorber 204 and target surface of analyte target 206, thermally desorbing adsorbed analyte 217. Direct exposure to primary infrared emission 203 can lead to excessive heating and melting of certain materials being interrogated. Infrared thermal desorber 200 and performing infrared thermal desorption provides rapid and temporally discrete heating periods that converts infrared energy of primary infrared emission 203 to thermal energy emission 205 for conductive and convective heat transfer to analyte target 206. Generated vapors and aerosols of adsorbed analyte 217 as volatilized analyte 207 are transported through effluent communicator 211 or gas sampling tube 218 to analyzer 226 for detection that include, e.g., MS, IMS, molecular sensing, and the like. Accordingly, infrared thermal desorber 200 and performing infrared thermal desorption provide real-time sampling and detection over large areas, as well as high throughput screening. Infrared thermal desorber 200 and performing infrared thermal desorption can sample directly large or onerous pieces of evidence in forensic applications.

Advantageously, infrared thermal desorber 200 and processes herein overcome limitations and technical deficiencies of conventional devices such as being unable to achieve elevated temperatures to thermally desorb non-volatile compounds; limited to single steady-state temperature for wide range of sample volatilities. Further, conventional devices have lengthy heat-up periods (e.g., 30 minutes) to achieve steady-state temperatures and require continuous energy supply (e.g., 100% duty cycle power to heater).

Beneficially, infrared thermal desorber 200 provides rapid heating rates (e.g., increasing temperature profile), vaporizing compounds at their optimal temperature during that ramp, and achieves elevated temperatures needed to thermally desorb non-volatile compounds (e.g., chlorate and perchlorate oxidizer salts, high mass toxins, and the like).

Infrared thermal desorber 200 and processes herein unexpectedly provide energy efficient operation by allowing operation-on-demand with no energy consumption between analyses and no heat-up period. Moreover, infrared thermal desorber 200 provides semi-remote sampling modes of operation.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. An infrared thermal desorber comprising: a desorption housing; an infrared source receiver disposed on the desorption housing and that receives an infrared emission source such that the infrared emission source produces primary infrared emission; an infrared absorber receiver disposed on the desorption housing and that receives an infrared absorber; the infrared absorber disposed on the infrared absorber receiver, such that the infrared absorber: is in infrared communication with the infrared emission source, receives the primary infrared emission from the infrared emission source, produces thermal energy emission from the primary infrared emission in response to receipt of the primary infrared emission, communicates the thermal energy emission from the infrared absorber, and subjects an analyte target to the thermal energy emission such that a temperature of the analyte target increases in response to receipt of the thermal energy emission from the infrared absorber, and the analyte target releases adsorbed analyte disposed on the analyte target as a volatilized analyte in response to the increase of the temperature of the analyte target; an analyte target receiver disposed on the desorption housing and that receives the analyte target, such that the analyte target receiver is in thermal communication with the infrared absorber disposed in the infrared absorber receiver so that the analyte target receives the thermal energy emission from the infrared absorber, desorbs adsorbed analyte as volatilized analyte from the analyte target in response to receipt of the thermal energy emission from the infrared absorber, and communicates the volatilized analyte from the analyte target; and the analyte target; an effluent communicator disposed on the desorption housing in gas communication with the analyte target and comprising a flow outlet in gas communication with the analyte target, such that the effluent communicator receives the volatilized analyte desorbed from the analyte target in response to the analyte target being subjected to the thermal energy emission from the infrared absorber; and communicates the volatilized analyte through the flow outlet from the desorption housing, wherein: the infrared absorber and the analyte target are separate physical components, such that the infrared absorber is a different component than the analyte target; the analyte target is detachably removable from the analyte target receiver and desorption housing; and the analyte is adsorbed on the analyte target prior to the analyte target being received by the analyte target receiver and prior to the analyte target being disposed on the desorption housing, such that the analyte target and the analyte are condensed phase components.

2. The infrared thermal desorber of claim 1, further comprising the infrared emission source disposed on the infrared source receiver in infrared line-of-sight with the infrared absorber and that selectively produces primary infrared emission.

3. The infrared thermal desorber of claim 2, wherein the infrared emission source comprises a quartz heater.

4. The infrared thermal desorber of claim 1, further comprising an analyte target slot disposed on the desorption housing, wherein the analyte target is received by the analyte target slot for disposal on the analyte target receiver.

5. The infrared thermal desorber of claim 4, further comprising the analyte target disposed on the analyte target receiver, such that the analyte target receives the thermal energy emission from the infrared absorber and a temperature of the analyte target increases in response to receipt of the thermal energy emission from the infrared absorber, wherein the analyte target releases adsorbed analyte disposed on the analyte target as the volatilized analyte in response to the increase of the temperature of the analyte target.

6. The infrared thermal desorber of claim 1, wherein the analyte target receiver is interposed between the infrared source receiver and the infrared absorber receiver.

7. The infrared thermal desorber of claim 6, further comprising the analyte target disposed on the analyte target receiver and interposed between the infrared emission source and the infrared absorber.

8. The infrared thermal desorber of claim 1, wherein the infrared absorber receiver is interposed between the infrared source receiver and the analyte target receiver.

9. The infrared thermal desorber of claim 8, further comprising the infrared absorber disposed on the infrared absorber receiver interposed between the infrared emission source and the analyte target.

10. The infrared thermal desorber of claim 9, wherein the analyte target receiver is disposed on an external surface of the infrared absorber.

11. The infrared thermal desorber of claim 10, wherein the desorption housing is moveable over a surface of the analyte target disposed on the external surface of the desorption housing so that the desorption housing is arbitrarily repositionable over a selected portion of the analyte target.

12. The infrared thermal desorber of claim 1, further comprising a gas sampling tube in fluid communication with the analyte target and disposed in the effluent communicator at the flow outlet, such that the gas sampling tube receives the volatilized analyte from the analyte target and communicates the volatilized analyte in a gas flow direction from the desorption housing.

13. The infrared thermal desorber of claim 1, further comprising a flow inlet disposed on the desorption housing in fluid communication with the flow outlet, such that the flow inlet receives a background gas flow so that the background gas flow entrains the volatilized analyte from the analyte target and communicates the volatilized analyte to the effluent communicator.

14. The infrared thermal desorber of claim 1, further comprising an infrared transmissive gas partition disposed on the desorption housing in infrared communication with the infrared absorber, such that the infrared transmissive gas partition is transmissive to the primary infrared emission from the infrared emission source, communicates the primary infrared emission from the infrared emission source to the infrared absorber, and seals the infrared emission source from the analyte target so that volatilized analyte from the analyte target does not contact the infrared emission source.

15. The infrared thermal desorber of claim 1, further comprising a power source in electrical communication with the infrared emission source, such that the power source provides electrical power to the infrared emission source from which the infrared emission source produces the primary infrared emission.

16. The infrared thermal desorber of claim 1, further comprising an analyzer in fluid communication with the flow outlet, such that the analyzer receives the volatilized analyte from the desorption housing, analyzes the volatilized analyte, and produces a gas analysis from analysis of the volatilized analyte to determine a chemical composition or quantity of the volatilized analyte.

17. A process for performing infrared thermal desorption with the infrared thermal desorber of claim 1, the process comprising: adsorbing an analyte on an analyte target prior to the analyte target being received by the analyte target receiver and prior to the analyte target being di;posed on the desorption housing; receiving the analyte target, with the analyte adsorbed on the analyte target, on the analyte target receiver; producing, by the infrared emission source, the primary infrared emission; receiving, by the infrared absorber, the primary infrared emission from the infrared emission source; producing, by the infrared absorber, the thermal energy emission from the primary infrared emission in response to receipt of the primary infrared emission; communicating the thermal energy emission from the infrared absorber; receiving, by the analyte target, the thermal energy emission from the infrared absorber; desorbing the adsorbed analyte as the volatilized analyte from the analyte ta-get in response to receipt of the thermal energy emission by the analyte target from the infrared absorber; communicating the volatilized analyte from the analyte target; receiving, by the effluent communicator, the volatilized analyte desorbed from the analyte target in response to the analyte target being subjected to the thermal energy emission from the infrared absorber; and communicating the volatilized analyte through the flow outlet from the desorption housing to perform infrared thermal desorption, wherein: the infrared absorber and the analyte target are separate physical components, such that the infrared absorber is a different component than the analyte target; the analyte target is detachably removable from the analyte target receiver and desorption housing; and the analyte is adsorbed on the analyte target prior to the analyte target being received by the analyte target receiver and prior to the analyte target being disposed on the desorption housing, such that the analyte target and the analyte are condensed phase components.

18. The process of claim 17, further comprising receiving the analyte target by an analyte target slot disposed on the desorption housing.

19. The process of claim 17, further comprising moving the desorption housing over a surface of the analyte target disposed on an external surface of the desorption housing; and optionally arbitrarily repositioning the desorption housing over a selected portion of the analyte target.

20. The process of claim 17, further comprising receiving a background gas flow in the desorption housing; entraining the volatilized analyte from the analyte target in the background gas flow; and communicating the volatilized analyte entrained in the background gas flow to the effluent communicator.

21. The process of claim 17, further comprising communicating the volatilized analyte from the effluent communicator to an analyzer; receiving the volatilized analyte by the analyzer; analyzing, by the analyzer, the volatilized analyte; producing, by the analyzer, a gas analysis of the volatilized analyte; and determining a chemical composition or quantity of the volatilized analyte.

* * * * *